(12) United States Patent
Batcher (10) Patent No.: US 6,873,707 B1
(45) Date of Patent: Mar. 29, 2005

(54) HARDWARE-BASED ENCRYPTION/ DECRYPTION EMPLOYING CYCLE STEALING

(75) Inventor: Kenneth W. Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 09/670,892

(22) Filed: Sep. 28, 2000

(51) Int. Cl.[7] .......................... H04K 1/00; H04K 1/04; H04L 5/00; G06F 1/04
(52) U.S. Cl. ..................... 380/255; 380/36; 380/261; 713/400; 713/401; 713/500; 713/600; 714/709
(58) Field of Search ........................... 380/19, 28, 29, 380/30, 36, 42, 43, 255, 261, 282, 285, 46, 274; 713/400, 401, 500, 600; 714/709; 327/141, 144, 153; 326/94; 365/238.5, 189.05

(56) References Cited

U.S. PATENT DOCUMENTS

| | | | | |
|---|---|---|---|---|
| 4,128,876 A | * | 12/1978 | Ames et al. ............... 709/248 |
| 4,245,304 A | * | 1/1981 | Porter et al. ............... 711/122 |
| 5,517,657 A | * | 5/1996 | Rodgers et al. ............ 711/169 |
| 5,691,943 A | * | 11/1997 | Yun ....................... 365/189.05 |
| 5,694,370 A | * | 12/1997 | Yoon ...................... 365/233.5 |
| 5,790,838 A | * | 8/1998 | Irish et al. .................. 713/500 |
| 5,809,309 A | * | 9/1998 | Leach et al. ............... 710/260 |
| 5,973,989 A | * | 10/1999 | Pawlowski .................. 365/233 |
| 5,999,458 A | * | 12/1999 | Nishimura et al. ..... 365/189.05 |
| 6,044,484 A | * | 3/2000 | Chung ........................ 714/766 |
| 6,128,233 A | * | 10/2000 | Yu et al. ................ 365/189.02 |
| 6,268,746 B1 | * | 7/2001 | Potter et al. .................. 326/93 |
| 6,292,403 B1 | * | 9/2001 | Pancholy et al. ...... 365/189.05 |
| 6,333,954 B1 | * | 12/2001 | Hansquine .................. 375/341 |
| 6,525,971 B2 | * | 2/2003 | Merritt et al. ......... 365/189.05 |
| 6,549,622 B1 | * | 4/2003 | Matthews, Jr. ............... 380/29 |

* cited by examiner

*Primary Examiner*—Emmanuel L. Moise
(74) *Attorney, Agent, or Firm*—Tucker Ellis & West LLP (57) ABSTRACT

A system for the encryption and decryption of data employing cycle stealing to accelerate data processing operations. The cycle stealing is employed by using level sensitive latches in a microcode controller system for storing addresses and code words. The microcode controller system controls the data path hardware for executing the encryption/decryption operations.

15 Claims, 6 Drawing Sheets

PRIOR ART

HARDWARE-BASED ENCRYPTION/ DECRYPTION EMPLOYING CYCLE STEALING

FIELD OF INVENTION

The present invention generally relates to a system for encryption and decryption of data, and more particularly to a hardware-based encryption and decryption system employing cycle stealing.

BACKGROUND OF THE INVENTION

In a typical wireless LAN configuration, A common model for network processing consists of a multi-level approach. This is common in many Ethernet LAN protocols such as IEEE 802.3. The model typically includes 3 major levels, namely a) Top:Logical-Link control; b) Middle: Medium Access Control (MAC); and c) Bottom: Physical interface (PHY).

A wireless LAN configuration compliant to IEEE 802.11 is similar to its wired counterpart and has the same three levels. Traditionally, the top Logical-Link control tasks are handled by software running on a HOST processor. The middle level is the responsibility of a MAC processor, which handles all frame traffic between the HOST and the PHY level.

In a typical wireless local area network (WLAN) configuration, a portable or mobile device (e.g., a laptop personal computer) normally includes a HOST processor and a PCI card or PCMCIA card. On this card resides a Medium Access Control (MAC) processing system, a PHY (physical layer) processing device (e.g., a digital signal processor), and a main memory. The MAC processing system includes a MAC processor (e.g., an embedded processor), which is a multi-functional processor engine responsible for a variety of different processing tasks associated with the wireless communications. The PHY processing device performs such functions as encoding/decoding waveforms. Data transferred between the PHY processing device and the MAC processing system (i.e., the PHY data stream) may be encrypted using an encryption algorithm, such as RC4. Consequently, encrypted data received by the MAC processing system from the PHY processing device is initially stored to the main memory as encrypted data. At a later time, the MAC processor reads the stored encrypted data from main memory and decrypts the data. The decrypted data is then written to the main memory for subsequent processing by the HOST processor.

Similarly, in the case of a data transmission from the MAC processor to the PHY data processing device, the data originates from the HOST processor that writes the data as plaintext to the main memory. The MAC processor will at a later time read the data from the main memory and encrypt it, using the same RC4 algorithm. Then the encrypted data is transmitted to the PHY processing device.

Encryption algorithm RC4 (developed by RSA Data Security, Inc.) is used to encrypt data in accordance with Wired Equivalent Privacy for the IEEE wireless communications standard 802.11. RC4 is a variable key-size stream cipher with byte-oriented operations. The algorithm is based on the use of a random permutation. Analysis shows that the period of the cipher is overwhelmingly likely to be greater than $10^{100}$. Eight to sixteen machine operations are required per output byte, and the cipher can be expected to run very quickly in software. RC4 is commonly used for file encryption and for secure communications, as in the encryption of traffic to and from secure web sites using the secured socket layer (SSL) protocol.

In the prior art, both software and hardware approaches have been used to implement the private key RC4 algorithm. In the case where all operations are performed in software, a simple C program can be used, such as those illustrated herein. The RC4 algorithm can be divided into three basic phases: phase 1 for lookup and loading of a private key; phase 2 having two parts, namely phase 2a for filling S-box table linearly and phase 2b for initializing the S-box table with the private key; and phase 3 for the encrypting/ decrypting operation (including determination of an X byte and an XOR operation).

It should be understood that Phase 2 of the algorithm includes the two steps of: (phase 2a) filling an S-box table (256×8) linearly: $S_0=0, S_1=1, \ldots S_{235}=255$; and then (phase 2b) initializing the S-box table by scrambling the table with the private key, repeating the key as necessary to address all 256 locations in the array. For example, if a 16 byte key is used, the sequence would be: $KEY_0, KEY_1, \ldots, KEY_{15}$, $KEY_0, KEY_1, \ldots, KEY_{15}$ repeating this sequence a total of 16 times to complete the scrambling. It should be appreciated that the term "key" refers to a plurality of "key values." In accordance with a preferred embodiment, each key value is a byte, and a key is comprised of 16 key values (i.e., 16 bytes). 16 bytes are required for 128-bit encryption. The key is a private key known only to the transmitter and receiver(s) of the encrypted data.

As indicated above, in Phase 2b of the RC4 algorithm the S-box table is initialized with the private key. In this regard, index j is set to zero, then:

For i=0 to 255:

$j=(j+S_i+KEY_i) \bmod 256$ swap $S_i$ and $S_j$

In the third phase (phase 3), two counters, i and j, are initialized to zero to index through the 256×8 S-box in a pseudorandom fashion. Thereafter, random bytes X are generated as follows:

$i=(i+1) \bmod 256$ $j=(j+S_i) \bmod 256$

Swap $S_i$ and $S_j$ $t=(S_i+S_j) \bmod 256 \quad X=S_t$

The foregoing code sequence is performed for every byte to be encrypted/decrypted. Being a symmetric cryptosystem, the same algorithm is used to decrypt or encrypt data depending on how the XOR data is used. In this regard, the byte X is XORed with plaintext to produce ciphertext or XORed with ciphertext to produce plaintext.

Although the software implementation of the foregoing encryption algorithm appears simple in high level code, the software approach is slow. The software approach is too slow to meet the tight turn around time requirements of IEEE 802.11.

Figure 2:
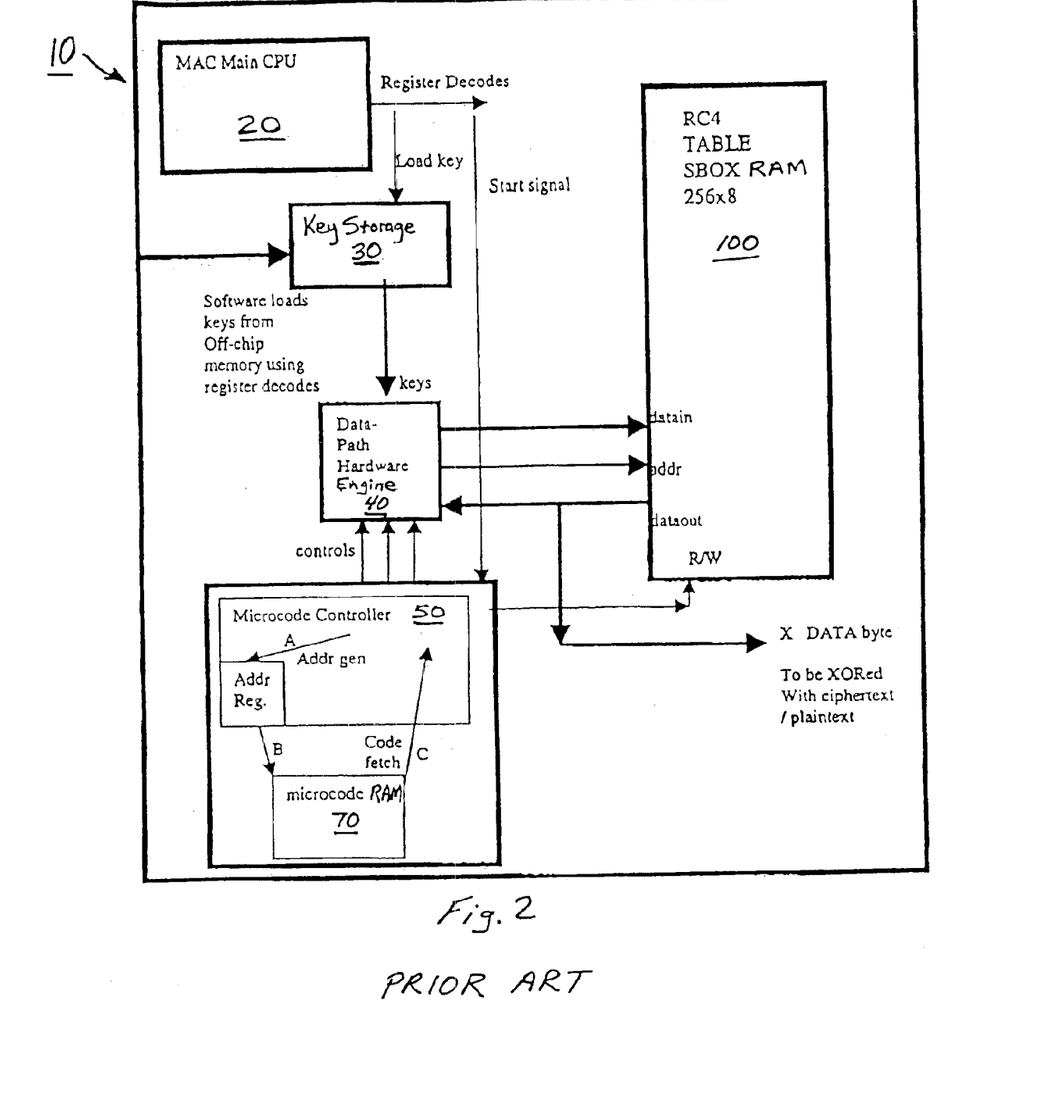
FIG. 2 is a block diagram of a typical prior art hardware configuration for performing encryption/decryption.

In view of the deficiencies of the software implementation, hardware modifications to the MAC processor have been used to accelerate operation of the algorithm. Referring now to FIG. 2, there is shown a MAC processor 10 according to the prior art. MAC processor 10 is generally comprised of a CPU 20, a key storage 30, data path hardware engine 40, microcode controller 50, microcode RAM 70, and S-Box RAM 100.

CPU 20 is the main processing device of MAC processor 10, and provides signals for controlling operation of key storage 30 and microcode controller 50. Keys are commonly stored in "off-chip" RAM since they are large (often 128 bits or more), and there are many keys that might be used to decrypt and encrypt data depending on the source and destination of the packet address. Therefore, in the prior art a small on-chip key storage 30 is used to hold the current key bytes being used. Key storage 30 is loaded by using register decodes under the direction of software. Therefore, once the proper key is found, software can load the key and start phase 2 of the encryption algorithm discussed above. Data path hardware engine 40 provides an 8-bit wide data path for performing data manipulation for the RC4 algorithm. Data path hardware engine 40 includes elements such as registers, adders, multiplexers, etc., used to read key storage 30 and R/W S-box table RAM 100. Microcode controller 50 is used to control the data path to execute the operations needed to execute the RC4 algorithm. S-box table RAM 100 is an "on-chip" RAM (i.e., RAM located on the MAC processor chip) which stores the S-box table. The use of an "on-chip" RAM allows for faster initialization and XOR byte generation than obtained with off-chip memory access.

The present invention provides enhancements to the hardware arrangement in order to further improve the speed of the encryption/decryption operations.

SUMMARY OF THE INVENTION

According to a first aspect of the present invention there is provided a method for accelerating the generation of control signals in a microcode controller system including a microcode controller, a microcode memory, an address latch and a code word latch, the method comprising: opening the address latch during the second half of a clock cycle to store therein an address decoded by the microcode controller, while simultaneously closing the code word latch during the second half of a clock cycle; presenting the address stored in the address latch to the microcode memory to read out a code word therefrom; opening the code word latch during the first half of a clock cycle to store the code word read out from the microcode memory to the code word latch, while simultaneously closing the address latch during the first half of a clock cycle; and presenting the code word stored in the code word latch to the microcode controller for generation of output control signals and decoding at least one address.

According to another aspect of the present invention there is provided a microcode controller system comprising: control means for generating control signals and decoding address data; means for latching address data decoded by the control means, said means for latching address data opening during the second half of a clock cycle to store therein said decoded address data; means for latching code word data, said means for latching code word data closing during the second half of a clock cycle, simultaneous with the opening of the means for latching address data; and means for storing code word data, wherein code word data is read out of the means for storing code word data in response to presentation thereto of the address data stored in the address latch, wherein said means for latching code word data opens during the first half of a clock cycle to store the code word data read out from the means for storing code word data, and said means for latching address data simultaneously closes during the first half of a clock cycle, said control means generating control signals and decoding at least one address, using the code word data stored in the means for latching code word data.

According to another aspect of the present invention there is provided a microcode controller system comprising: a microcode controller for generating control signals and decoding address data; an address latch for storing address data decoded by the microcode controller, said address latch opening during the second half of a clock cycle to store said decoded address data therein; a code word latch for storing code word data, said code word latch closing during the second half of a clock cycle, simultaneous with the opening of the address latch; and a microcode memory, wherein code word data is read out of the microcode memory in response to presentation thereto of the address data stored in the address latch, wherein said code word latch opens during the first half of a clock cycle to store the code word data read out from the microcode memory, and said address latch simultaneously closes during the first half of a clock cycle, said microcode controller generating control signals and decoding at least one address, using the code word data stored in the code word latch.

According to another aspect of the present invention there is provided a method A method for accelerating the generation of control signals in a microcode controller system including a microcode controller, a microcode memory, an address latch and a code word latch, the method comprising: opening the address latch during the second half of a clock cycle to store therein an address decoded by the microcode controller, and closing the address latch during the first half of a clock cycle; presenting the address stored in the address latch to the microcode memory to read out a code word therefrom; presenting the code word read out from the microcode memory to the microcode controller, said microcode controller generating output control signals and decoding at least one address from said presented code word.

According to another aspect of the present invention there is provided a microcode controller system comprising: control means for generating control signals and decoding address data; means for latching address data decoded by the control means, said means for latching address data opening during the second half of a clock cycle to store therein said decoded address data, and closing during the first half of a clock cycle; and means for storing code word data, wherein code word data is read out of the means for storing code word data in response to presentation thereto of the address data stored in the means for latching address data, wherein said code word data read out from the means for storing code word data is presented to said control means for generating control signals and decoding address data.

According to another aspect of the present invention there is provided a microcode controller system comprising: a microcode controller for generating control signals and decoding address data; an address latch for latching address data decoded by the microcode controller, said address latch opening during the second half of a clock cycle to store therein said decoded address data, and closing during the first half of a clock cycle; a code word memory for storing code word data, wherein code word data is read out of the code word memory in response to presentation thereto of the address data stored in the address latch, wherein said code word data read out from the code word memory is presented to said microcode controller to generate control signals and decode address data.

According to another aspect of the present invention there is provided a method for accelerating the generation of control signals in a microcode controller system including a microcode controller, a microcode memory, an address latch and a code word latch, the method comprising: presenting an address decoded by the microcode controller to the microcode memory to read out a code word therefrom; opening the code word latch during the first half of a clock cycle to store the code word read out from the microcode memory to the code word latch, and closing the code word latch during the second half of the clock cycle; and presenting the code word stored in the code word latch to the microcode controller for generation of output control signals and decoding at least one address.

According to another aspect of the present invention there is provided a microcode controller system comprising: control means for generating control signals and decoding address data; means for latching code word data, said means for latching code word data closing during the second half of a clock cycle; and means for storing code word data, wherein code word data is read out of the means for storing code word data in response to presentation thereto of the address data decoded by the control means, means for storing code word data, wherein code word data is read out of the means for storing code word data in response to presentation thereto of the address data decoded by the control means, wherein said means for latching code word data opens during the first half of a clock cycle to store the code word data read out from the means for storing code word data, said control means generating control signals and decoding at least one address, using the code word data stored in the means for latching code word data.

According to another aspect of the present invention there is provided a microcode controller system comprising: a microcode controller for generating control signals and decoding address data; a latch for storing code word data, said latch closing during the second half of a clock cycle; and a memory for storing code word data, wherein code word data is read out of the memory in response to presentation thereto of the address data decoded by the microcode controller, wherein said latch opens during the first half of a clock cycle to store the code word data read out from the memory, said microcode controller generating control signals and decoding at least one address, using the code word data stored in the latch.

According to another aspect of the present invention there is provided a method for accelerating the generation of control signals in a microcode controller system including a microcode controller and a dual read port microcode memory having (1) a first read port comprised of: (a) a first read address port and (b) a first read data port, and (2) a second read port comprised of: (a) a second read address port and (b) a second read data port, the method comprising: presenting an address decoded by the microcode controller to the first read address port, to read out a code word from the first read data port; generating microcode control signals at the microcode controller using the code word from the first data output port; generating a next address at the microcode controller using the code word from the first data output port; presenting the next address to the second read address port to read out a next code word from the second read data port; and alternating use of the first and second read ports for every other clock cycle.

According to another aspect of the present invention there is provided a system for accelerating the generation of control signals in a microcode controller system including: a microcode controller for decoding addresses and generating microcode control signals; and a dual read port microcode memory having: (1) a first read port comprised of: (a) a first read address port and (b) a first read data port, and (2) a second read port comprised of: (a) a second read address port and (b) a second read data port, wherein an address decoded by the microcode controller is presented to the first read address port, to read out a code word from the first read data port, said microcode controller using the code word from the first data output port to generate microcode control signals and generate a next address, wherein said next address is presented to the second read address port to read out a next code word from the second read data port, said first and second read ports are alternately read from every other clock cycle.

According to another aspect of the present invention there is provided a system for accelerating the generation of control signals in a microcode controller system including: a microcode controller for decoding addresses and generating microcode control signals; and a dual read port microcode memory having: (1) a first read port comprised of: (a) a first read address port and (b) a first read data port, and (2) a second read port comprised of: (a) a second read address port and (b) a second read data port, wherein an address decoded by the microcode controller is presented to the first read address port, to read out a code word from the first read data port, said microcode controller using the code word from the first data output port to generate microcode control signals and generate a next address, wherein said next address is presented to the second read address port to read out a next code word from the second read data port, said first and second read ports are alternately read from every other clock cycle.

According to another aspect of the present invention there is provided a method for accelerating the generation of control signals in a pipelined microcode controller system including a microcode controller, a microcode memory, a plurality of address latches and a plurality of code word latches, and having a plurality of clock cycle phases, the method comprising: (a) opening a code word latch during the Nth phase of the clock cycle to store code word data therein read out from the microcode memory; (b) closing said code word latch during the N+1 phase of the clock cycle, simultaneous with the opening of an address latch, wherein said address latch opens during the N+1th phase of a clock cycle to store address data read out from the microcode memory for the subsequent phase of the clock cycle after the N+1th phase of the clock cycle; and repeating steps (a) and (b) with alternating phases of the clock cycle for respective opening and closing of the address latch and code word latch for a plurality of phases of the clock cycle.

According to another aspect of the present invention there is provided a system A system for accelerating the generation of control signals in a pipelined microcode controller system having a plurality of clock cycle phases including: a microcode controller for decoding addresses and generating microcode control signals; a microcode memory for storing code word data; a plurality of address latches associated with the microcode controller and microcode memory; and a plurality of code word latches associated with the microcode controller and microcode memory, wherein (a) a code word latch is opened during the Nth phase of the clock cycle to store code word data therein read out from the microcode memory, (b) the code word latch is closed during the N+1 phase of the clock cycle, simultaneous with the opening of an address latch, wherein said address latch opens during the N+1th phase of a clock cycle to store address data from the microcode controller for the subsequent phase of the clock cycle after the N+1th phase of the clock cycle, wherein steps (a) and (b) are repeated with alternating phases of the clock cycle for respective opening and closing of the address latch and code word latch for a plurality of phases of the clock cycle.

According to another aspect of the present invention there is provided a system for accelerating the generation of control signals in a pipelined microcode controller system having a plurality of clock cycle phases including: processing means for decoding addresses and generating microcode control signals; means for storing code word data; a plurality of means for latching address data; and a plurality of means for latching code word data, wherein (a) a means for latching code word data is opened during the Nth phase of the clock cycle to store code word data therein read out from the microcode memory, (b) the means for latching code word data is closed during the N+1 phase of the clock cycle, simultaneous with the opening of a means for latching address data, wherein said means for latching address data opens during the N+1th phase of a clock cycle to store address data from the processing means for the subsequent phase of the clock cycle after the N+1th phase of the clock cycle, wherein steps (a) and (b) are repeated with alternating phases of the clock cycle for respective opening and closing of the means for latching address data and means for latching code word data, for a plurality of phases of the clock cycle.

An advantage of the present invention is the provision of a system for microcode controller system that provides faster and more efficient execution of an encryption/decryption algorithm.

Another advantage of the present invention is the provision of a microcode controller system provides greater ease of operation.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

It should be understood that while a preferred embodiment of the present invention is described in connection with the RC4 encryption/decryption algorithm, the present invention is also suitably applicable to other encryption/decryption algorithms to provide improved processing speed and efficiency. Furthermore, while the present invention has been described in the context of a system for encrypting and decrypting data, the present invention is also contemplated for use with applications outside of encryption/decryption, as a means for accelerating data processing operations.

Figure 1:
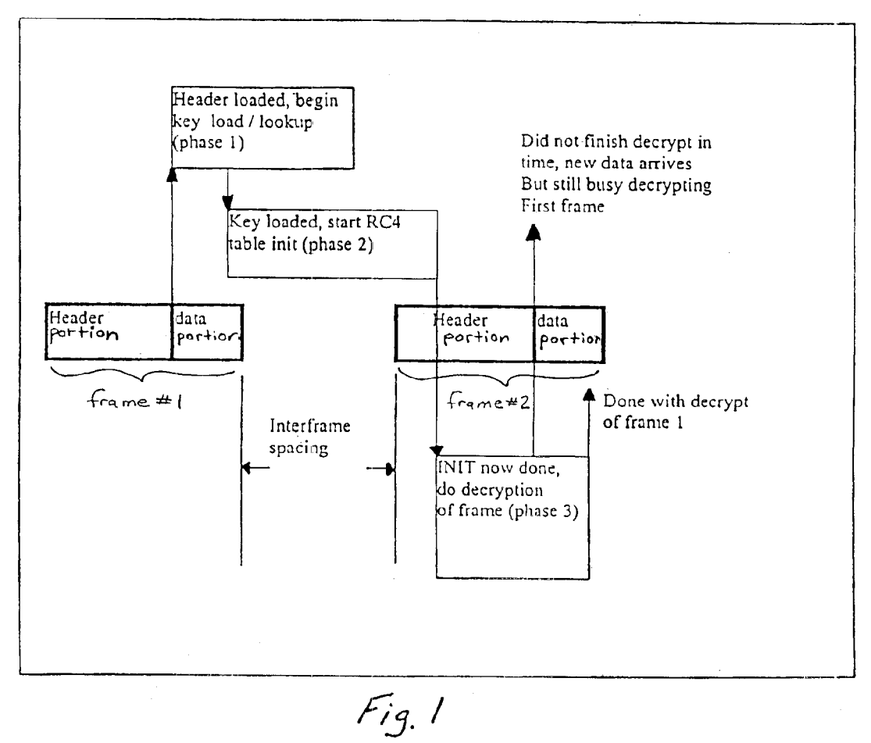
FIG. 1 illustrates a typical PHY data stream.

Referring now to the drawings wherein the showings are for the purposes of illustrating a preferred embodiment of the invention only and not for purposes of limiting same, FIG. 1 illustrates a typical PHY data stream. The PHY data stream include data frames having two main components, namely, a header portion, and a data portion. The header portion includes control information such as source, destination address; data rate, etc. The MAC processor processes the header information so it knows how to deal with the data portion. Furthermore, some information in the header portion may direct the MAC processor to perform actions such as generating a response message to the sender or steering the data to another station. The header portion is not typically encrypted. The data portion typically includes data that is encrypted, and is intended for processing by the HOST processor. This data may be used by the HOST processor to communicate with other HOST processors across a network using some upper level protocol, such as sending an FTP from one station to another station. In the case of a system complying with IEEE standard 802.11, the HOST processor does not use the header information.

The data processing steps for decryption using prior art systems will now be described in detail with reference to FIGS. 1 and 2. As can be seen in FIG. 1, each frame of data is comprised of a header portion and a data portion. A short time gap (i.e., interframe spacing) is provided between each frame. After the header portion of the first data frame (frame #1) has been loaded, phase 1 of the RC4 algorithm commences. The address portion of the header is used to begin the key lookup. After the proper key is found, it is loaded into the key register. While this is happening, encrypted data continues to arrive from the PHY processing device. After the key (i.e., the plurality of key values) is completely loaded into the key register, phase 2 of the RC4 algorithm commences. Phase 2 continues until a period of time after the header for the next data frame (frame #2) has begun to be received. However, most of the time for phase 2 occurs during the interframe spacing. Phase 3 (decrypting/encrypting operation for frame #1) will commence while the header for the next data frame (frame #2) is still being received by the MAC processor. However, as shown, due to the tight turn around time; decryption of all data of frame #1 is not completed before the data portion of frame #2 is received. This is due to the long period of time needed to complete phases 1 and 2 using the prior art system as shown in FIG. 2. It should be understood that a different key may be used for each received data frame since the MAC processor may be receiving data from different clients, each having a unique private key.

As indicated above, the IEEE wireless communication standard 802.11 requires the use of RC4 to encrypt and decrypt frames that are delivered across a wireless LAN. This creates the potential for performance problems since the inter frame spacing timing (SIFs) between data packets is tight as shown in FIG. 1. The decryption of a frame must complete before a subsequent frame arrives so that the next frame can be decrypted. As described above, the RC4 algorithm uses a multiple step process to prepare an S-box table. This process includes finding and loading a private key, and then scrambling the S-box table to initialize it with the private key. The key loading process cannot begin until the header portion of a frame has been processed. Consequently, there is little time to decrypt the data portion of the frame before the next frame arrives. The problem is more pronounced on short frames since there is little time to "amortize the cost" of loading the key and initializing the S-box table with the key, over the packet size.

Figure 3:
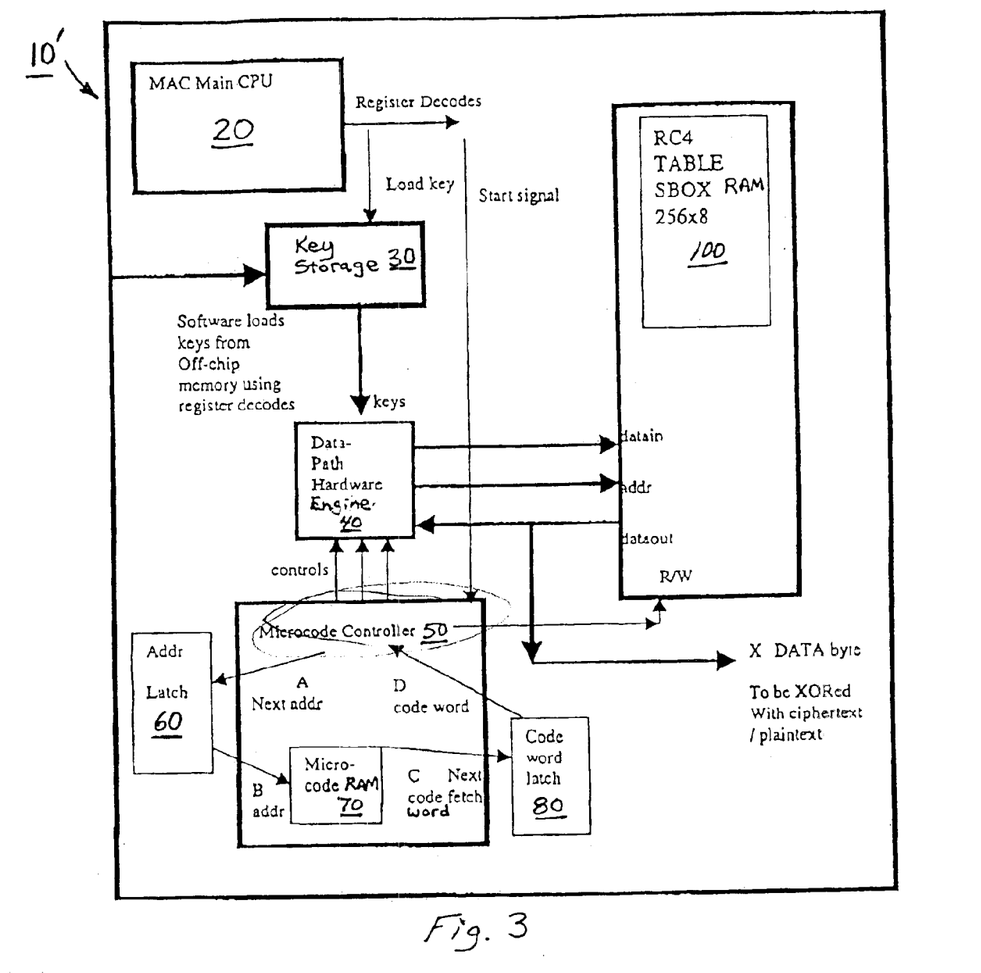
FIG. 3 is a block diagram of a hardware configuration for performing encryption/decryption, according to a preferred embodiment of the present invention.

Referring now to FIG. 3, there is shown a modified MAC processor 10', according to a preferred embodiment of the present invention. The present invention contributes to faster processing of phase 2 (S-box table initialization) and phase 3 (decrypt/encrypt) of the RC4 algorithm.

In this regard, the present invention accelerates operations of microcode controller 50 by using an address latch 60 and an instruction code word latch 80 to create the effect of a dual ported microcode storage, as will be described in further detail below. This allows optimization of the RC4 algorithm in that the fetch of the next microcode word and current microcode execute operation can proceed on the same clock cycle. These cycle stealing latches also help to improve critical paths, allowing intermediate results to race ahead and get captured by flip flops where the control signals then go to the data path. Therefore, the present invention contributes to significant improvement in the speed of the microcode operations for preparing the S-box tables.

The performance boost provided by the level sensitive latches will now be described with reference to the timing diagram of FIG. 4. Section I shows the timing associated with the prior art, while Section II shows the timing associated with the present invention. This figure shows five (5) clock cycles and a starting signal (START). For Section I, the signals are labeled A, B, C to correspond to the microcontroller arrangement of FIG. 2 (prior art). For Section II, the signals are labeled A, B, C, and D to correspond to the microcontroller arrangement of FIG. 3 (present invention). The "XXX" sequences indicate when the next address and code word fetch buses are not stable due to memory access and decode times. An incrementing sequence is shown where the code address begins at 0 and a corresponding code word fetch occurs (C0). The sequence continues, address 1 and code word fetch occurs (C1), etc. In accordance with the prior art, a flip flop is used to hold the address which gets updated on the rising edge of the clock pulse. The microcode fetch then occurs using the address flip flop with approximate timing as shown in section I. The current code word, in turn, is used to decode and calculate the next address, which gets updated at the next rising edge (e.g. C0 generates address 1). As can be observed, the next address just makes the setup time, thus very little slack exists in setup timing using the prior art. Consequently, increasing the clock frequency is not possible.

In the case of the present invention (FIG. 3), the address flip flop is replaced with a level sensitive address latch 60. Address latch 60 is closed the $1^{st}$ half of the clock cycle and then open the $2^{nd}$ half of the clock cycle. Code word latch 80 is also provided to the code word fetch path, which is closed the $2^{nd}$ half of the clock cycle and then open the $1^{st}$ half of the clock cycle. Code word latch 80 is used to present the code word into microcode controller 50, and address latch 60 is used to present the address to microcode RAM 70, as shown in FIG. 3. During the first phase (i.e., $1^{st}$ half of the clock cycle) code word latch 80 is open and the next instruction flows through. At mid-cycle address latch 60 opens and code word latch 80 closes, thus holding the current instruction safely as the address changes to microcode RAM 70. Address latch 60 opens during the back half of the clock cycle to allow the next address to be calculated ahead of time (forwarding ahead), so that it is ready by the end of the clock cycle.

Figure 4:
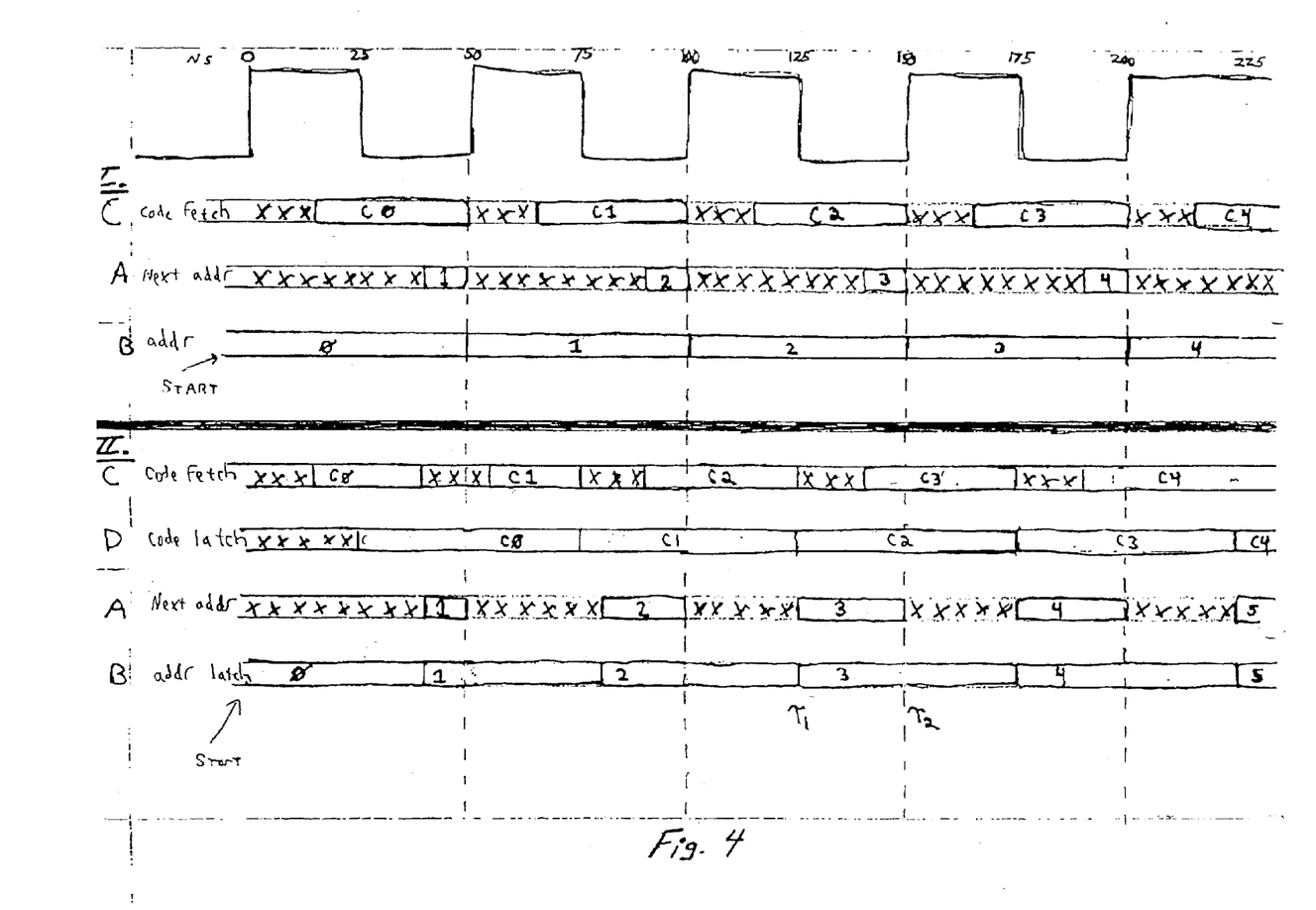
FIG. 4 illustrates timing diagrams for microcode controller fetch and execute phases according to both the prior art, and a preferred embodiment of the present invention, wherein level sensitive latches are employed.

For example, before point T1 in the FIG. 4, the next address is calculated from the decode of code fetch contents (instruction C2 decoded to generate next address 3). Address latch 60 is frozen prior to point T1, and consequently the code fetch is held stable. After point T1 address latch 60 opens and updates to the next address (address 3). Normally, this would cause the code fetch to update and transition before point T2. However, microcode controller 50 uses the latched version of the code word fetch, hence code word latch 80 closes at point T1 and microcode controller 50 sees a stable code word (C2) at the point T2 where it is correctly executed. It should be appreciated that the code words may not proceed in a linear fashion as shown, such as in the case of loops and branches.

The end result is that the code word is ready earlier in accordance with the present invention. Accordingly, the next address calculation is made earlier in time, since a cycle stealing occurs from the address latch to the code word latch. Therefore, it is possible to speedup the clock frequency X2 using the present invention, as compared to using the prior art, since the setup/hold relationship to the latches are improved.

It should be appreciated that alternative embodiments of the present invention include the use of only a latch to cycle steal address data, the use of only a latch to cycle steal code word data, as well as the use of a pair of latches to cycle steal both address data and code word data, as described above.

In an alternative embodiment, the microcode storage is implemented with a multiple read port memory (rather than latches) to create a similar effect as in the preferred embodiment. A typical dual read port memory includes (1) a first read port comprised of: (a) a first read address port and (b) a first read data port, and (2) a second read port comprised of (a) a second read address port and (b) a second read data port. In this alternative embodiment, a dual read port microcode memory is used for microcode RAM 70. An address decoded by microcode controller 50 is presented to the first read address port, to read out a code word from the first read data port. The code word read out of the first read data port is used to generate the next address which is presented to the second read address port. The code word read out of the first read data port is also used by the microcode controller to generate microcode control signals. The next address is used to obtain the next code word from the second read data port. Processing continues as with the first code word. Use of the dual read ports is alternated, such that the first read address/data ports functions as the second read address/data ports, and the second read address/data ports function as the first read address/data ports, every other clock cycle. It should be further noted that the dual read port microcode memory may be a synchronous memory (clocked) or asynchronous memory (non-clocked). Moreover, the dual read port microcode memory may be a synchronous burst or non-burst memory.

Figure 5:
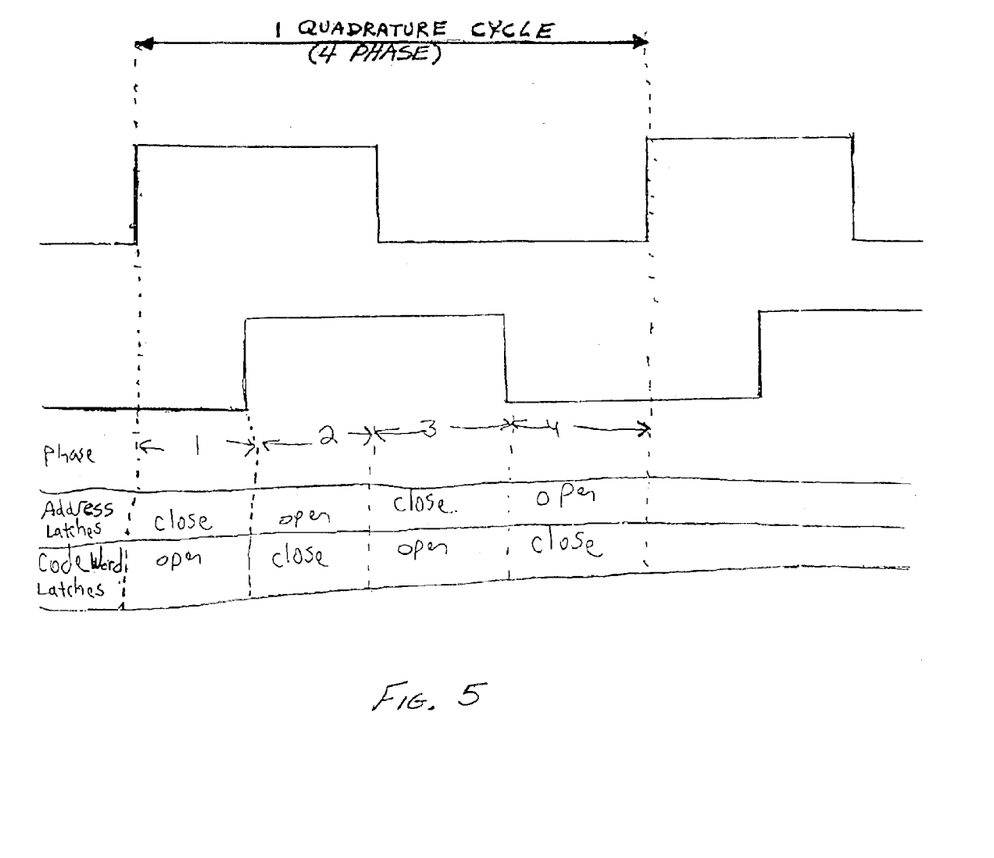
FIG. 5 illustrates a timing diagram for an alternative embodiment of the present invention, wherein multiple stages of level sensitive latches are employed.

In yet another alternative embodiment, multiple address latches and multiple code word latches are used in a pipelined system. In this regard, code word data and address data are latched in a pipelined system having a plurality of clocked execution phases. A code word latch for storing code word data is opened during the Nth phase of a clock cycle to store the code word data read out from microcode memory to the code word latch. This code word latch is closed during the N+1th phase of a clock cycle, simultaneous with the opening of the address latch on the same phase. The address latch opens during the N+1 th phase of a clock cycle to store the address data from the microcode controller for the subsequent phase of the clock cycle after the N+1th phase of a clock cycle. The foregoing sequence repeats as stated above, with alternating phases for the opening and closing of the address and code word latches for a plurality of phases of the clock cycle. For instance, the code word latch is open on odd phases clock cycles (i.e., 1, 3, 5, etc.) and is closed on even phase clock cycles (i.e., 2, 4, 6, etc.). Likewise, the address latch is open on even phase clock cycles and closed on odd phase clock cycles. A representative timing diagram showing a 4 phase clocking system is shown in FIG. 5.

It should be understood that all the improvements mentioned for decryption of data are likewise realized for encryption of data.

Figure 6:
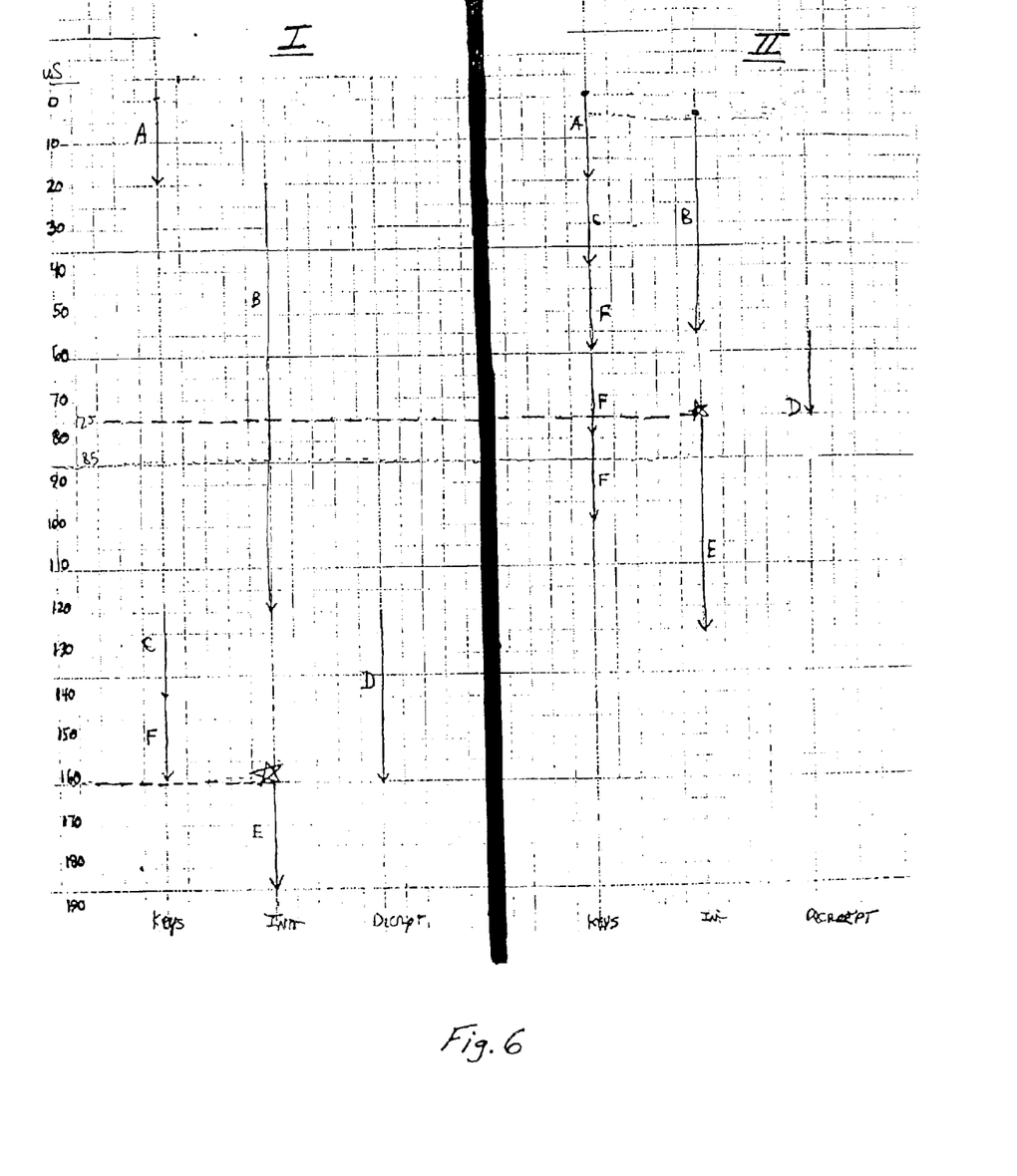
FIG. 6 shows timelines illustrating improvements in data processing speed ver the prior art.

FIG. 6 provides timelines for a decryption operation that illustrate performance improvements contributed by the present invention. Section I is a timeline associated with the prior art, while Section II is a time line associated with the present invention. It should be appreciated that Section II also illustrates the effects provided by use of a dual ported key storage, as disclosed in related application Ser. No. 09/675,069, filed Sep. 28, 2000, and assigned to the assignee of the present application. Dual ported key storage allows a key to be loaded into memory (write port) (phase 1), while simultaneously reading a key (read port) to initialize the S-box table with the keys (phase 2). The timelines of FIG. 6 show the six basic steps that are performed (A–F) during two back-to-back decryption phases. Steps A–F correspond to the tasks noted in the table below:

| STEP | TASK |
|---|---|
| A | Lookup and load key for frame #1. May also start phase 2a of frame #1 at this step. (phase 1/2a). |
| B | Initialize S-box table for frame #1. May also do phase 2a of frame #1 at this step. (phase 2a/2b). |
| C | Lookup and load key for frame #2. May also start phase 2a of frame #2 at this step. (phase 1/2a) |
| D | Perform decryption for frame #1 (phase 3) |
| E | Initialize S-box table for frame #2. May also do phase 2a of frame #2 at this step. (phase 2a/2b) |
| F | Lookup and load key for frame #3. May also start phase 2a of frame #3 at this step. (phase 1) |

The three columns in Sections I and II of FIG. 6 respectively show the resource utilization for loading keys (phase 1), initialization of the S-box table (phase 2) and decryption (phase 3). As can be seen, the prior art takes 160 μs to finish with the first decryption (frame #1) and start the next decryption (frame #2). The present invention contributes to the completion of the same tasks in 75 μs through use of level sensitive latches during microcode fetch and execute (as shown with the star in FIG. 6). In this regard, reference is made to the length of timelines B, E and D in Sections I and II.

It should be appreciated that in alternative embodiments of the present invention, independent transmission (TX) and reception (RX) engines or a single shared TX/RX engine may be provided. The encryption/decryption engine, being comprised of memories and datapath, may include a common data path with multiple SBOX memories used for TX and RX of forthcoming packets. Another alternative includes the use multiple datapaths and SBOX memories for full parallel operations. In this regard it would be possible to perform a full duplex TX encryption and RX decryption at the same time. It should be appreciated that any number of multiple instances of encryption/decryption engines may be provided on a single MAC processor (e.g., four receive engines, two transmit engines for a total of six different SBOX tables and six different key registers).

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A method for accelerating the generation of control signals in a microcode controller system including a microcode controller, a microcode memory, a level-sensitive address latch and a level sensitive code word latch, the method comprising:

opening the address latch during one of a high level and a low level of a clock cycle to store therein an address decoded by the microcode controller, while simultaneously closing the code word latch during the second half of a clock cycle;

presenting the address stored in the address latch to the microcode memory to read out a code word therefrom;

opening the code word latch during the respective other of the high level and the low level of a clock cycle to store the code word read out from the microcode memory to the code word latch, while simultaneously closing the address latch; and presenting the code word stored in the code word latch to the microcode controller for generation of output control signals and decoding at least one address.

2. A microcode controller system comprising:

control means for generating control signals and decoding address data;

means for latching address data decoded by the control means, said means for latching address data opening during a second one of a high level and a low level of a clock cycle to store therein said decoded address data;

means for latching code word data, said means for latching code word data closing during the second half of a clock cycle, simultaneous with the opening of the means for latching address data; and means for storing code word data, wherein code word data is read out of the means for storing code word data in response to presentation thereto of the address data stored in the address latch, wherein said means for latching code word data opens during the first one of the high level and the low level of a clock cycle to store the code word data read out from the means for storing code word data, and said means for latching address data simultaneously closes during the first one of the high level and the low level of a clock cycle, said control means generating control signals and decoding at least one address, using the code word data stored in the means for latching code word data.

3. A microcode controller system comprising:

a microcode controller for generating control signals and decoding address data;

a level-sensitive address latch for storing address data decoded by the microcode controller, said address latch opening during a low level of a clock cycle to store said decoded address data therein;

a level sensitive code word latch for storing code word data, said code word latch closing during the low level of a clock cycle, simultaneous with the opening of the address latch; and a microcode memory, wherein code word data is read out of the microcode memory in response to presentation thereto of the address data stored in the address latch, wherein said code word latch opens during the high level of a clock cycle to store the code word data read out from the microcode memory, and said address latch simultaneously closes during the high level of a clock cycle, said microcode controller generating control signals and decoding at least one address, using the code word data stored in the code word latch.

4. A method for accelerating the generation of control signals in a microcode controller system including a microcode controller, a microcode memory, a level-sensitive address latch and a level-sensitive code word latch, the method comprising:

opening the address latch during a low level of a clock cycle to store therein an address decoded by the microcode controller, and closing the address latch during a high level of a clock cycle;

presenting the address stored in the address latch to the microcode memory to read out a code word therefrom;

presenting the code word read out from the microcode memory to the microcode controller, said microcode controller generating output control signals and decoding at least one address from said presented code word.

5. A microcode controller system comprising:

control means for generating control signals and decoding address data;

means for latching address data decoded by the control means, said means for latching address data opening during a low level of a clock cycle to store therein said decoded address data, and closing during a high level of a clock cycle; and means for storing code word data, wherein code word data is read out of the means for storing code word data in response to presentation thereto of the address data stored in the means for latching address data, wherein said code word data read out from the means for storing code word data is presented to said control means for generating control signals and decoding address data.

6. A microcode controller system comprising:

a microcode controller for generating control signals and decoding address data;

a level-sensitive address latch for latching address data decoded by the microcode controller, said address latch opening during one of a high level and a low level of a clock cycle to store therein said decoded address data, and closing during the respective other of the high level and the low level of a clock cycle;

a code word memory for storing code word data, wherein code word data is read out of the code word memory in response to presentation thereto of the address data stored in the address latch, wherein said code word data read out from the code word memory is presented to said microcode controller to generate control signals and decode address data.

7. A method for accelerating the generation of control signals in a microcode controller system including a microcode controller, a microcode memory, a level-senistive address latch and a level sensitive code word latch, the method comprising:

presenting an address decoded by the microcode controller to the microcode memory to read out a code word therefrom;

opening the code word latch during the one of a high level and a low level of a clock cycle to store the code word read out from the microcode memory to the code word latch, and closing the code word latch during the respective other of the high level and the law level of the clock cycle; and presenting the code word stored in the code word latch to the microcode controller for generation of output control signals and decoding at least one address.

8. A microcode controller system comprising:

control means for generating control signals and decoding address data;

means for latching code word data, said means for latching code word data closing during a low level of a clock cycle; and means for storing code word data, wherein code word data is read out of the means for storing code word data in response to presentation thereto of the address data decoded by the control means, wherein said means for latching code word data opens during a high level of a clock cycle to store the code word data read out from the means for storing code word data, said control means generating control signals and decoding at least one address, using the code word data stored in the means for latching code word data.

9. A microcode controller system comprising:

a microcode controller for generating control signals and decoding address data;

a level-sensitive latch for storing code word data, said latch closing during a low level of a clock cycle; and a memory for storing code word data, wherein code word data is read out of the memory in response to presentation thereto of the address data decoded by the microcode controller, wherein said latch opens during a high level of a clock cycle to store the code word data read out from the memory, said microcode controller generating control signals and decoding at least one address, using the code word data stored in the latch.

10. A method for accelerating the generation of control signals in a microcode controller system including a microcode controller and a dual read port microcode memory having (1) a first read port comprised of: (a) a first read address port and (b) a first read data port, and (2) a second read port comprised of: (a) a second read address port and (b) a second read data port, the method comprising:

presenting an address decoded by the microcode controller to the first read address port, to read out a code word from the first read data port;

generating microcode control signals at the microcode controller using the code word from the first data output port;

generating a next address at the microcode controller using the code word from the first data output port;

presenting the next address to the second read address port to read out a next code word from the second read data port; and alternating use of the first and second read ports for every other clock cycle.

11. A system for accelerating the generation of control signals in a microcode controller system including:

a microcode controller for decoding addresses and generating microcode control signals; and a dual read port microcode memory having:
(1) a first read port comprised of: (a) a first read address port and (b) a first read data port, and
(2) a second read port comprised of: (a) a second read address port and (b) a second read data port, wherein an address decoded by the microcode controller is presented to the first read address port, to read out a code word from the first read data port, said microcode controller using the code word from the first data output port to generate microcode control signals and generate a next address, wherein said next address is presented to the second read address port to read out a next code word from the second read data port, said first and second read ports are alternately read from every other clock cycle.

12. A system for accelerating the generation of control signals in a microcode controller system including:
processing means for decoding addresses and generating microcode control signals; and
means for storing code words having a dual read port, said means for storing code words including:
(1) a first read port comprised of: (a) a first read address port and (b) a first read data port, and
(2) a second read port comprised of: (a) a second read address port and (b) a second read data port,
wherein an address decoded by the processing means is presented to the first read address port, to read out a code word from the first read data port, said processing means using the code word from the first data output port to generate microcode control signals and generate a next address, wherein said next address is presented to the second read address port to read out a next code word from the second read data port, said first and second read ports are alternately read from every other clock cycle.

13. A method for accelerating the generation of control signals in a pipelined microcode controller system including a microcode controller, a microcode memory, a plurality of level-sensitive address latches and a plurality of level-sensitive code word latches, and having a plurality of clock cycle phases, the method comprising:
(a) opening a code word latch during the Nth phase of the clock cycle to store code word data therein read out from the microcode memory;
(b) closing said code word latch during the N+1 phase of the clock cycle, simultaneous with the opening of an address latch, wherein said address latch opens during the N+1th phase of a clock cycle to store address data read out from the microcode memory for the subsequent phase of the clock cycle after the N+1th phase of the clock cycle; and
repeating steps (a) and (b) with alternating phases of the clock cycle for respective opening and closing of the address latch and code word latch for a plurality of phases of the clock cycle, wherein the alternating phases are each respectively one of high-level or low level.

14. A system for accelerating the generation of control signals in a pipelined microcode controller system having a plurality of clock cycle phases including:

a microcode controller for decoding addresses and generating microcode control signals;
a microcode memory for storing code word data;
a plurality of level-sensitive address latches associated with the microcode controller and microcode memory; and
a plurality of level-sensitive code word latches associated with the microcode controller and microcode memory,
wherein (a) a code word latch is opened during the Nth phase of the clock cycle to store code word data therein read out from the microcode memory, (b) the code word latch is closed during the N+1 phase of the clock cycle, simultaneous with the opening of an address latch, wherein said address latch opens during the N+1th phase of a clock cycle to store address data from the microcode controller for the subsequent phase of the clock cycle after the N+1th phase of the clock cycle, wherein steps (a) and (b) are repeated with alternating phases of the clock cycle for respective opening and closing of the address latch and code word latch for a plurality of phases of the clock cycle, wherein the alternating phases are each respectively one of high-level or low level.

15. A system for accelerating the generation of control signals in a pipelined microcode controller system having a plurality of clock cycle phases including:
processing means for decoding addresses and generating microcode control signals;
means for storing code word data;
a plurality of means for level-sensitive latching address data; and
a plurality of means for level-sensitive latching code word data,
wherein (a) a means for latching code word data is opened during the Nth phase of the clock cycle to store code word data therein read out from the microcode memory, (b) the means for latching code word data is closed during the N+1 phase of the clock cycle, simultaneous with the opening of a means for latching address data, wherein said means for latching address data opens during the N+1th phase of a clock cycle to store address data from the processing means for the subsequent phase of the clock cycle after the N+1th phase of the clock cycle, wherein steps (a) and (b) are repeated with alternating phases of the clock cycle for respective opening of the means for latching address data and means for latching code word data, for a plurality of phases of the clock cycle, wherein the alternating phases are each respectively one of high-level and low-level.

* * * * *